March 23, 1943.　　　G. H. PALM　　　2,314,553
CONTROL VALVE
Filed April 26, 1941
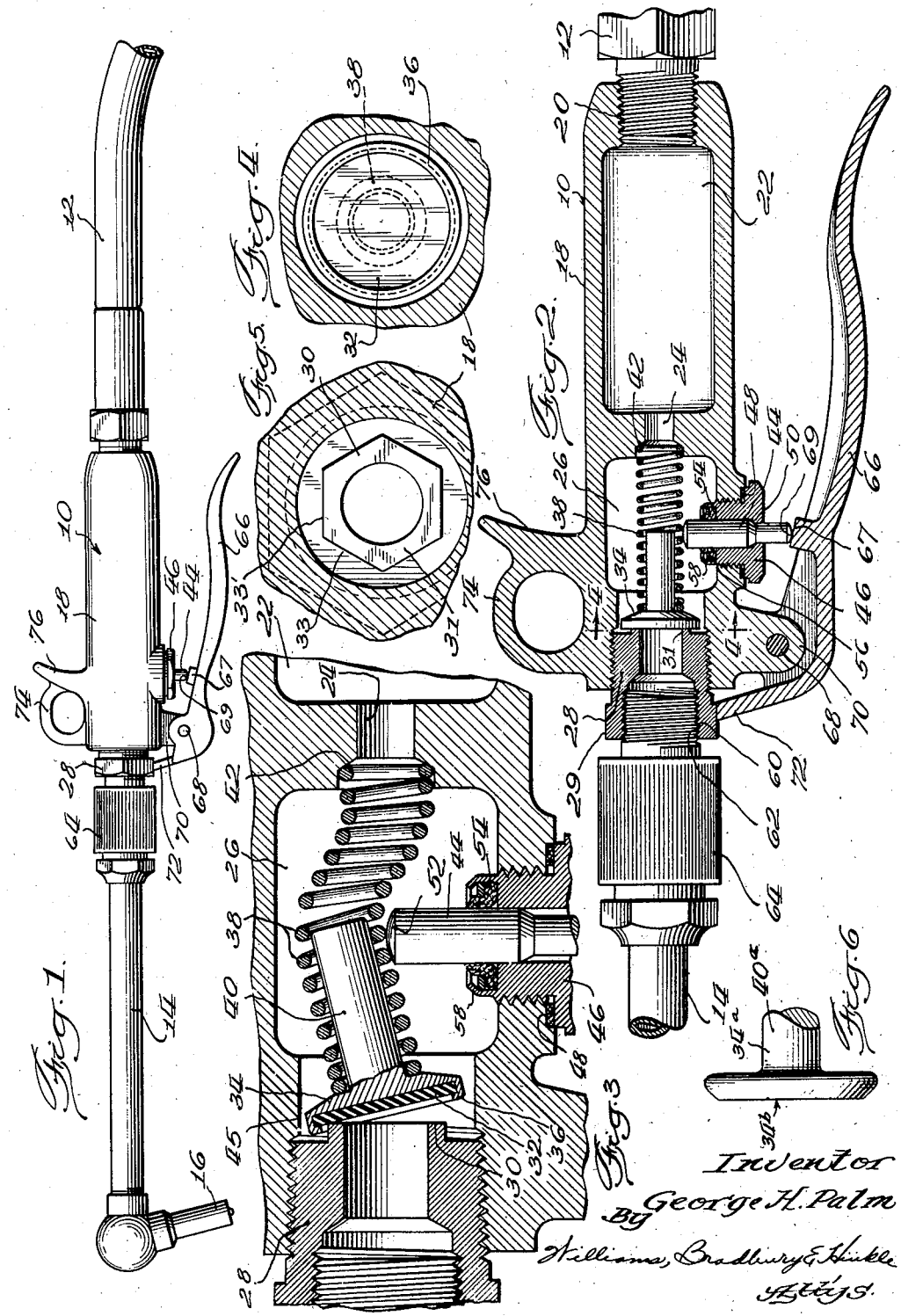
Inventor
George H. Palm
By Williams, Bradbury & Hinkle
Attys.

Patented Mar. 23, 1943

2,314,553

UNITED STATES PATENT OFFICE 2,314,553

CONTROL VALVE

George H. Palm, Chicago, Ill., assignor to Stewart-Warner Corporation, Chicago, Ill., a corporation of Virginia Application April 26, 1941, Serial No. 390,453

1 Claim. (Cl. 251—125)

My invention pertains to control valves and is more particularly concerned with a valve especially adapted to control the discharge from pumps of the kind used to supply lubricant to the transmission housings and differentials of automobiles.

An object of my invention is to provide a simple and inexpensive control valve which will be durable and trouble-free in use.

Another object is to provide an improved control valve which may be readily grasped and easily operated.

Another object is to provide an improved control valve which may be readily disassembled to remove dirt or other impurities which may interfere with the operation of the valve.

Other objects and advantages will become apparent as the description proceeds.

In the drawing:

Fig. 1 is a side elevation of a control valve embodying my invention;

Fig. 2 is a vertical longitudinal section through the control valve of Fig. 1;

Fig. 3 is a partial section similar to Fig. 2, but on an enlarged scale and showing the valve in open position;

Fig. 4 is a partial section taken on the line 4—4 of Fig. 2, looking in the direction of the arrows;

Fig. 5 is a view similar to Fig. 4, but looking in the oppostie direction; and

Fig. 6 is a partial side elevation of a modified form of valve.

The control valve of my invention is particularly designed for installation in the discharge conduits of pumps of the type commonly used to supply lubricant to the transmission housings and differentials of automobiles. Such pumps commonly either maintain a quantity of lubricant under pressure or automatic means is provided to start the pump mechanism when the pressure in the discharge conduit is relieved. In either instance, the discharge of lubricant from the pump is controlled by a valve in the discharge conduit.

In Fig. 1 I have illustrated one form of my control valve 10 as being connected to the discharge conduit 12 of a pump of the type which I have described. In this figure I have shown my control valve as being provided with a nozzle 14 having a tip 16 adapted to be inserted in the filler openings of transmission housings, differential casings, and similar enclosures. The tip 16 is illustrated as being of the non-drip type. In lieu of the nozzle 14 I may attach to the discharge side of my control valve a conventional rubber tube or any other form of spout through which the lubricant is conducted to the point of application.

Referring more particularly to Figs. 2, 3 and 4, it will be seen that my control valve comprises a tubular body 18 having a threaded inlet 20 for attachment to the conduit 12. Lubricant entering through the threaded opening 20 flows through a chamber 22 and passage 24 into valve chamber 26. The discharge end of the valve chamber 26 is partially closed by a hollow plug 28 threadedly attached to the body 18.

The plug 28 has an hexagonal nut-like portion 29 and a tubular extension 31 terminating in a flat valve seat 30. As clearly shown in Fig. 5, the outer wall 33 of the tubular extension 31 is hexagonal and the flat surfaces of the wall 33 lie in planes parallel to the flat surfaces of the nut-like portion 29, so that an inspection of the nut-like portion 29 indicates the position of the flat surfaces of the wall 33. In practice, the plug 28 is screwed into the body 18 to such position that one of the flat surfaces of the nut-like portion 29 and the corresponding flat surface of the wall 33 (marked 33' in Fig. 5) are horizontal, as shown in Fig. 5.

The valve seat 30 is adapted to be engaged by the disc 32 carried by the valve 34 in the embodiment of Figs. 1 to 4, inclusive. Where the control valve is to be used to control the flow of oil or grease, the disc 32 is preferably made of a synthetic rubber, such as "Corprene," or other suitable material which will not be attacked by the lubricant. But where the control valve is to be used to control the flow of water or other fluid non-injurious to rubber, this disc may be formed of natural rubber.

The disc 32 is located in a recess in the valve 34 and is secured in place by turning over the lip 36, as clearly shown in Fig. 3 of the drawing. The valve is normally held in sealing engagement with its seat 30 by means of a spring 38 which surrounds the valve stem 40 and which is seated against a shoulder 42 provided by the body 18.

The valve 34 is moved out of sealing engagement with its seat 30 by means of a two-diameter plunger 44 mounted in a plug 46 threaded into one wall of the valve chamber 26. A gasket 48 is preferably provided to form a sealed joint between the plug 46 and the body 18. This plug 46 has a shoulder 50 limiting outward movement of the plunger 44 under the force exerted thereon by lubricant pressure in valve chamber 26.

The inner end of the plunger 44 is rounded, as indicated at 52, and this rounded portion of the plunger 44 is adapted to engage the spring 38 and rock the valve on its seat, as clearly shown in Fig. 3. In thus rocking on its seat, the valve pivots on the straight edge formed by the intersection of the flat surface 33' with the face of valve seat 30. This straight edge has an appreciable area of contact with the valve disc 32 and avoids the unnecessary cutting of the valve disc, which would occur if the wall 33 were made circular and only a point contact provided between the edge of this wall and the valve disc 32.

The thrust of the plunger 44 may shift the entire valve 34 laterally and bring its upper edge into contact with the adjacent wall 45 of the body 10. If such lateral shifting of the valve 34 occurs, the valve will not be coaxial with the plug 28 when plunger 44 is withdrawn. Such lateral shifting of the valve 34 does not in any way affect the operation of the device, and the operation is the same whether the valve remains in the position shown in the drawing or shifts laterally so that its upper edge contacts the wall 45.

A hat washer 54 of leather or other suitable material prevents leakage between the plunger 44 and plug 46. This hat washer is held in place by a metal annulus 56 secured by turning over the end of a thin tubular extension 58 forming an integral part of the plug 46. The hollow plug 28 is provided with an internal thread 60, which in the drawing is illustrated as cooperating with the external thread 62 of the nozzle 14. This nozzle is provided with a cylindrical grip 64 having a roughened surface to facilitate attachment or detachment of the nozzle. It will be understood that this nozzle may be replaced by a piece of flexible hose or any other form of spout for conducting the lubricant from the control valve to its point of application.

The plunger 44 is moved inwardly to rock the valve 34 by means of a handle 66 pivoted at 68 to an ear 70 forming an integral part of the body 18. This handle 66 has a boss 67 adapted to engage the rounded end 69 of the plunger 44. The handle 66 is provided with an extension 72 which engages the lower flat surface of the nut-like portion 29 of plug 28 to prevent the handle from falling below the horizontal position shown in the drawing.

The body 18 is provided with an integral loop 74 to permit the control valve to be hung on a hook attached to the lubricant pump or to any other suitable support. This loop terminates in an abutment 76 adapted to engage the operator's hand between the thumb and index finger. It will be noted that my control valve is designed to permit the operator to grasp the body 18 in the palm of his hand with the abutment 76 lying between his thumb and index finger and with his fingers engaging the lower side of the handle 66 so that by simply closing his hand, he can shift the valve 34 from the position of Fig. 2 to the position of Fig. 3. In this manner, by simply opening and closing his hand, he can control the discharge of lubricant from the nozzle 14. The parts are so designed that little force need be exerted on the handle 66 to shift valve 34 to open position and to hold it in such position during the discharge of lubricant into a transmission housing or other point of application.

My invention is not limited to the use of a valve incorporating the disc 32 of rubber or other similar material. In commercial practice I have found that the all-metal valve 34a of Fig. 6 is equally as good as, if not superior to, the valve 34. The valve 34a has a ground, seat-engaging face 34b and a stem 40a, which may be identical with the stem 40 of the valve 34. It will be understood by those skilled in the art that the valves 34 and 34a are interchangeable.

While I have illustrated and described in detail only one embodiment of my invention, it will be understood that my invention may assume numerous forms and is to be construed as including all forms coming within the scope of the appended claim.

I claim:

In a control valve of the class described, the combination of a body provided with a valve chamber, a rockable valve in said chamber for controlling flow therethrough, a tubular plug extending into said chamber, said plug having an external polygonal portion outside the body and a polygonal valve seat portion inside the body, said polygonal portions having their sides parallel, said valve seat portion having a flat valve engaging surface at substantially right angles to the axis of the plug, the edge defined by one side of the inner polygonal portion and the flat valve engaging surface constituting a fulcrum about which the valve is arranged to pivot, a plunger for rocking the valve about its fulcrum, said plunger being disposed at substantially right angles to the fulcrum, the sides of the external polygonal portion indicating the position of the corresponding parallel sides of the internal polygonal portion so as to insure proper positioning of the valve fulcrum, with respect to the plunger, and means for holding said valve in engagement with said seat.

GEORGE H. PALM.